Figure 1:
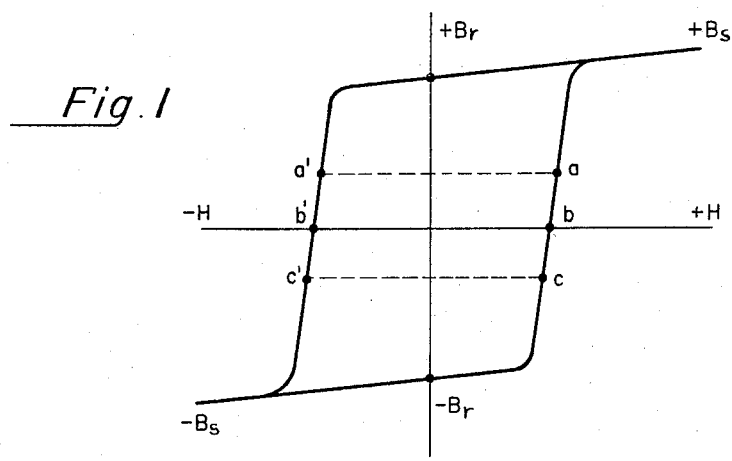

3,281,670
SELF-COMPENSATING MAGNETIC CORE MAGNETOMETER UTILIZING THE SWITCHING TIME OF THE CORE AS A MEASURE OF THE FIELD
Edward F. Myers, East Lansdowne, and John D. Hagee, Havertown, Pa., assignors to Burroughs Corporation, Detroit, Mich., a corporation of Michigan
Filed Apr. 6, 1962, Ser. No. 185,666
14 Claims. (Cl. 324—47)

This invention relates to magnetic flux detection apparatus and more specifically to magnetic core magnetometer apparatus of the type which utilizes the switching time of a magnetic core to detect and measure the intensity and direction of a static or dynamic magnetic field.

Sensitive magnetometers heretofore devised have been complex instruments requiring frequent adjustment. Generally, these prior art magnetometers are adversely affected by changes in temperature, supply voltage, etc., which makes their use cumbersome and inconvenient. Also, many of such prior art magnetometers are incapable of measuring both a static and a dynamic field.

Accordingly, one object of this invention is to provide a magnetometer whose sensitivity and accuracy is not affected by wide temperature changes and variations in the supply voltage.

Another object of this invention is to provide a magnetometer that requires no adjustment after it is put in service.

A further object of this invention is to provide a magnetometer capable of indicating and measuring both static and dynamic magnetic fields.

Still another object of this invention is to provide an extremely sensitive magnetic core magnetometer.

Still another object of this invention is to provide an improved magnetometer which overcomes the foregoing difficulties in an unusual and novel manner.

These and other objects are accomplished in the present invention by utilizing a magnetic material such as a magnetic core having a substantially rectangular hysteresis loop characteristic which provides two stable states. The magnetic material has its operating flux level biased at a fixed reference point on the hysteresis loop intermediate the two stable states. In order to switch the magnetic material from the fixed reference flux level to either of the stable states by a constant voltage pulse, a certain amount of time is required. Since it is well known that this switching time bears a direct relationship with the magnitude of the flux being switched, it is possible to measure the strength of a magnetic field by relating it to the switching time required. Thus, amplitude and direction changes in a dynamic magnetic field are perceived by a field sensing element which moves the operating point of the magnetic material along the hysteresis loop a proportionate distance in a corresponding direction from the original flux reference level, between the two stable states, thereby changing the time required to switch the magnetic material into one of its stable states. Suitable time detecting means such as AND gates sense the switching time of the magnetic material to give an indication and measure of the static or dynamic magnetic field. Feedback means are provided for maintaining the operating point stable at the fixed reference flux level in the absence of disturbances or changes in a magnetic field or a measurable magnetic field.

Figure 2:
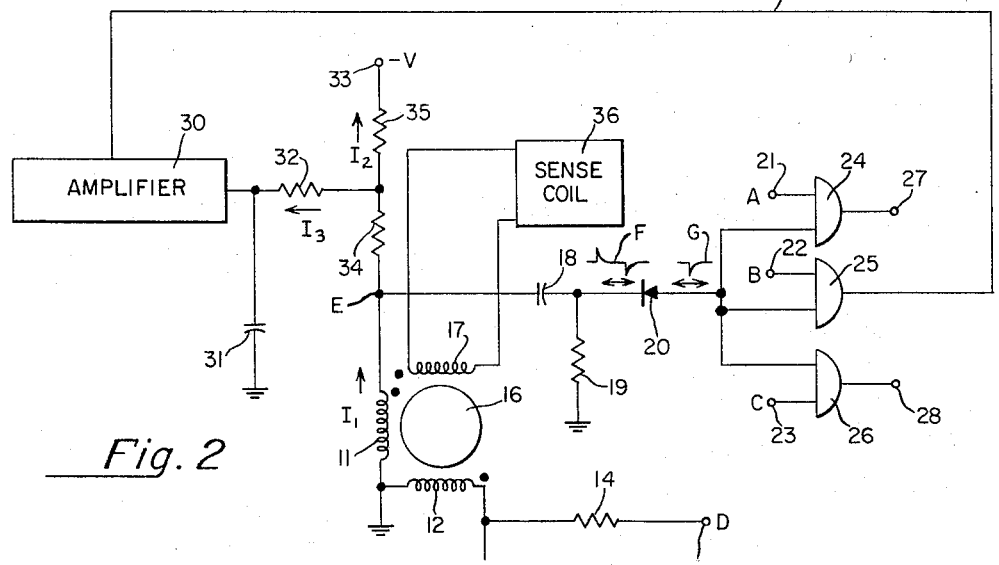
Figure 3:
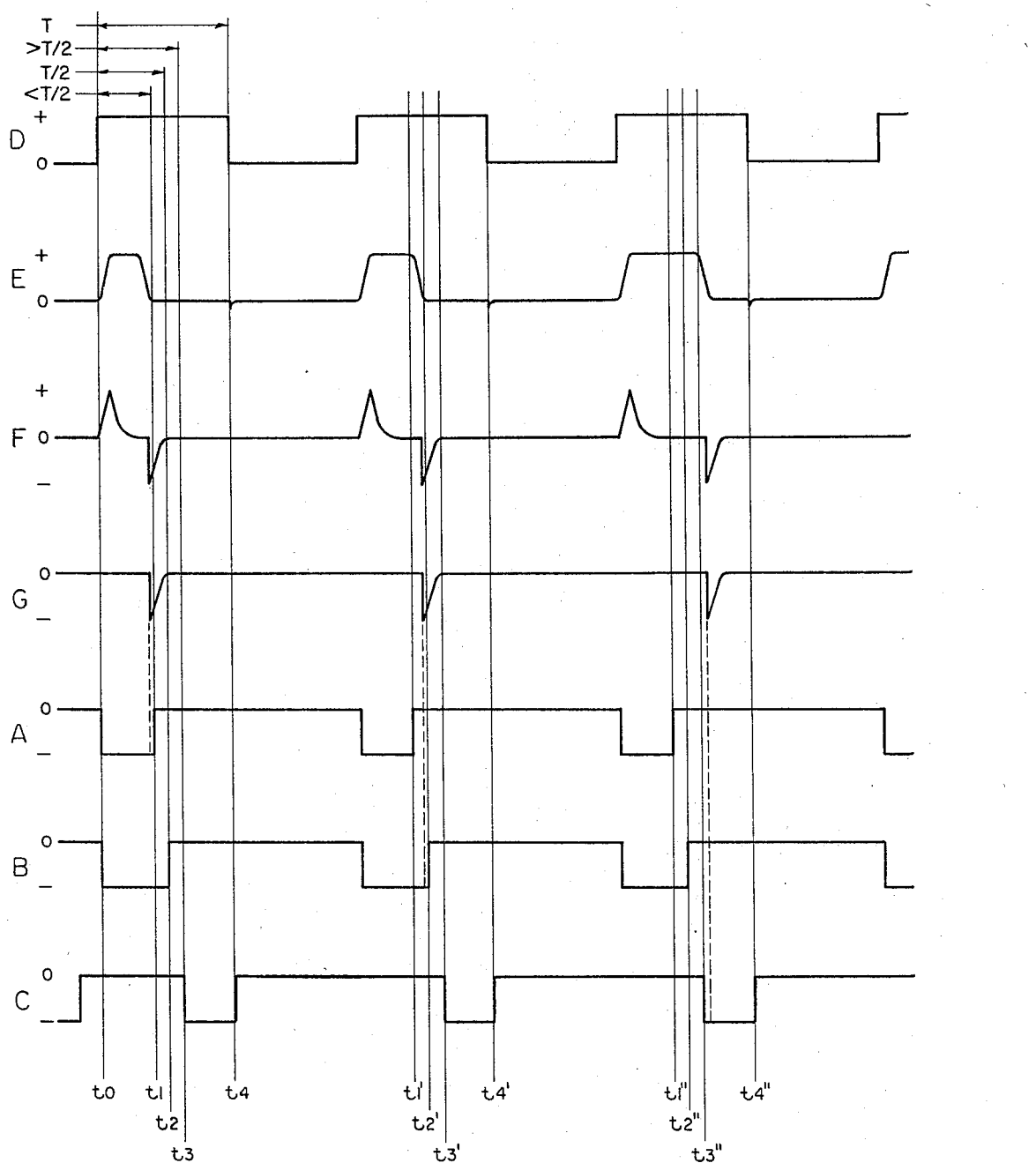

The exact nature of this invention, as well as other objects and advantages thereof, will be readily apparent from consideration of the following specification relating to the annexed drawing in which:

FIGURE 1 is a graph illustrating a typical rectangular hysteresis loop characteristic for a magnetic material;
FIGURE 2 shows a preferred embodiment of the present invention;
FIGURE 3 shows ideal wave forms which are applied to the circuit shown in FIGURE 2.

Referring now to FIGURE 1, there is shown a graph typifying the hysteresis loop characteristic of a magnetic material having a substantially rectangular characteristic. Positive saturation is indicated by the reference character $+B_s$, and the positive remanence stable state is indicated by the reference character $+B_r$. Negative saturation is indicated by the reference character $-B_s$ and the negative remanence stable state is indicated by the reference character $-B_r$. The vertical coordinate is in flux density B and the horizontal coordinate is in magnetizing force H or ampere turns.

When the core is switched from one stable remanence state to the other, from $+B_r$ to $-B_r$ for example, the path is through $+B_r$, $a'$, $b'$, $c'$, and $-B_s$ and $-B_r$. If the voltage applied to a winding on the core to cause the switching has a constant amplitude, the switching time is directly proportional to the amount of flux switched, i.e., when the core is switched from $+B_r$ to $-B_r$ the total flux is switched in time T. If the magnetic material was at point $b$ during the static condition, point $b$ being located midway between positive remanence $+B_r$ and negative remanence $-B_r$, then the switching path would be from point $b$ to $b'$, $c'$, $-B_s$ and $-B_r$ and the switching time would be $\frac{1}{2}T$ because only $\frac{1}{2}$ of the total flux would be switched. In like manner, if the magnetic material is switched to the negative remanence state $-B_r$ from point $a$ located above the midpoint $b$ and hence a greater distance from the negative remanence state $-B_r$, the switching time will be greater than $\frac{1}{2}T$ because more than $\frac{1}{2}$ of the total flux would be switched. Conversely, if the magnetic material is switched to the negative remanence state from point $c$, the time required will be less than $\frac{1}{2}T$ because less than $\frac{1}{2}$ of the total flux would be switched.

It is clear then, that if the operating point of a magnetic material is biased at a fixed flux reference level such as point $b$ on FIGURE 1, and if the operating point is moved along the hysteresis loop away from the fixed flux reference level, in a direction and by an amount commensurate with the magnitude and direction of the stable or dynamic field, thereby changing the time required to switch the magnetic material into one of its stable remanence states, then the intensity and direction of the applied field can be detected and measured by sensing the switching time of the magnetic material.

FIGURE 2 shows a preferred embodiment of the present invention which utilizes the switching properties of a magnetic material to measure the direction and intensity of static and dynamic magnetic fields. Referring now to FIGURE 2, there is shown a magnetic material having a substantially rectangular hysteresis loop characteristic (FIGURE 1) such as a magnetic core 16. A first or biasing winding 11 is wound on the core 16 and has one of its ends coupled to a source of reference potential such as ground and its other end connected through resistors 34 and 35 to a source of negative potential $-V$, a constant potential source, which is applied to this winding via terminal 33. A biasing current $I_1$ flows through the biasing winding 11 to bias the static operating point of the magnetic core 16 at a predetermined reference level on the hysteresis loop. This operating point is located interjacent the positive $+B_r$ and negative $-B_r$ remanence stable states and corresponds to point $b$ of FIGURE 1. The biasing current $I_1$ is made up of the sum of the current $I_2$ generated by the negative source of potential $-V$ and a feedback current $I_3$ provided by the capacitor 31 in a manner fully described hereinafter. A second or switching winding 12 also wound upon the magnetic core 16, has one of its ends connected to a source of reference potential such as ground and its other end connected through resistor 14 to a source of positive rectangular switching pulses which are applied to terminal 15. Also wound on the magnetic core is a third winding 17 both ends of which are coupled to a sensing coil 36 which may be a coil of copper wire. The sense coil 36 may be rotated in a static magnetic field in order to produce a current in the third winding 17 indicative of the strength of the static magnetic field. In a preferred use of the present invention the sense coil 36 is held stationary thereby providing a current to the third winding 17 indicative of changes in intensity of a dynamic or slowly changing static magnetic field.

Existing magnetic cores, such as that indicated by reference character 16 in FIGURE 2, have reacted to signals in the order of .05 microampere or less of D.C. or slowly varying A.C. signals. Accordingly, by properly selecting the material of the magnetic core 16, the circuit shown in FIGURE 2 can be used to indicate and measure relatively weak magnetic fields or small changes of intensity in magnetic fields.

To the junction of the first or biasing winding 11 with the resistance 34, there is connected an RC differentiating circuit comprising the capacitor 18 and the resistor 19 for differentiating a positive square wave of voltage which is induced in the biasing winding 11 when the magnetic core 16 is switched into one of its stable remanence states by the application of the positive switching pulse to terminal 15. A positive spike of voltage results from the differentiation that coincides with the leading edge of the switching pulse induced into the biasing winding 11. This positive spike is blocked by the diode 20 which will pass a negative spike of voltage resulting from the differentiation and which coincides with the trailing edge of the induced switching pulse. The duration of the induced switching pulse, and therefore the time of occurrence of the negative voltage spike, is determined by the time required to switch the core into one of its stable remanence states, which in turn is determined by the location of the operating point on the hysteresis loop immediately before the switching. This negative spike is then simultaneously applied to the three AND gates 24, 25, and 26 via their respective input leads. The output of AND gate 25 is applied by way of lead 29 to the amplifier 30 which in turn charges the feedback capacitor 31 in a manner described herein below. Also, as will be more fully discussed below, the outputs of AND gates 24 and 26 give an indication and measure of changes in intensity of a dynamic field or an indication and measure of a static magnetic field.

Referring now to FIGURE 3, there is shown a positive pulse D beginning at time $t_0$ and ending at time $t_4$ which is applied to terminal 15 (FIGURE 2) to switch the core 16 into one of its stable remanance states. A negative pulse B which begins at time $t_0$ and ends at time $t_2$ is applied to terminal 22 of the AND gate 25. The duration of this latter pulse is equal to the time required to switch the core 16 from the fixed reference point $b$ to one of the two stable remanance states such as negative remanence point $-B_r$. A second negative pulse A beginning at time $t_0$ and ending at time $t_1$ is applied to terminal 21 of the AND gate 24 and has a duration less than pulse B. A third negative pulse C which begins at time $t_3$ and ends at time $t_4$ is applied to terminal 23 of the AND gate 26. This negative pulse begins at a time subsequent to the termination of the negative B pulse.

The pulses shown in FIGURE 3 occur periodically at a rate determined by the utilization of the circuit shown in FIGURE 2. For example, if the circuit shown in FIGURE 2 is used only to measure and detect changes in intensity of a magnetic field the repetition rate can be relatively low because such changes in intensity normally occur at a relatively slow rate. In one embodiment of the present invention that was constructed a repetition rate of 10 cycles per second and 1,000 cycles per second was used. However, if the sensing coil 36 is rotated in a static magnetic field the repetition rate of the A, B, C and D pulses should be several times greater than the revolutions of the sensing coil. It will be obvious to those skilled in the art after a reading of the detail description set forth hereinafter that the circuit shown in FIGURE 2 can be used to measure and detect the direction and intensity of a static magnetic field and changes of intensity in such a field simultaneously.

The operation of the circuit shown in FIGURE 2 is such that in the absence of signal current in the windings 17, the biasing current $I_1$ is of sufficient magnitude to hold the operating point of the magnetic core 16 at point $b$ on the core hysteresis loop. The application of the positive pulse D to terminal 15 will cause a current through the second or switching winding 12 which switches the core in a time $\frac{1}{2}T$. The diode 13, which may be a zener diode, connected to the junction of the resistor 14 with the switching winding 12 clamps the positive pulse D to maintain a constant voltage across the switching winding 12 when the core is being switched.

The switching of the core 16 by the positive pulse D induces a positive voltage pulse into the first or biasing winding 11 having a duration of $\frac{1}{2}T$ and which is differentiated by the RC circuit comprising the capacitor 18 and the resistor 19. The negative spike of voltage, corresponding to the trailing edge of the switch induced pulse, resulting from this differentiation (the positive spike, corresponding to the leading edge of the induced pulse is blocked by the diode 20) is simultaneously applied to the AND gates 24, 25 and 26. There is no output on the terminal 27 of the AND gate 24 since the negative pulse A applied to its terminal 21 terminated prior to time $T/2$ and hence prior to the arrival of the negative spike. Conversely there is no output on terminal 28 of the AND gate 26 since the negative pulse C applied to its terminal 23 has not yet been initiated. Neither is there an output from the AND gate 25 because the leading edge of the negative spike occurs just as the negative B pulse, which is applied to terminal 22 of the AND gate 25, is terminated.

Suppose the static operating point tends to drift away from the fixed reference point $b$ toward point $c$. The next positive D pulse will cause a switching time less than $\frac{1}{2}T$. The negative spike from the differentiating circuit now occurs prior to time $t_2$ and will be gated against the negative B pulse, which is applied to terminal 22 of the AND gate 25, thereby producing an output on lead 29. This voltage output is amplified by the amplifier 30 and is then used to charge the capacitor 31 more negatively. This increase of negative voltage on capacitor 31 increases the feedback current $I_3$ which, in combination with the current $I_2$, increases the biasing current $I_1$ which tends to return the operating point to the fixed reference point $b$. The capacitor 31 has a discharging time constant determined by its magnitude and the magnitude of resistor 32, resistor 34 and the resistance of the biasing winding 11. The discharging time constant is designed to be several times slower than the period between the occurrence of the A, B, C and D pulses. This feedback or correcting circuit must operate at least part of the time to maintain the static operating point at the fixed reference point $b$.

If the static operating point tended to drift above the fixed reference point $b$ toward point $a$, the switching time would be greater than $\frac{1}{2}T$ and the negative spike, now occurring subsequent to time $t_2$, will not be gated by the AND gate 25 and the feedback capacitor 31 will not supply an increased feedback current $I_3$. The feedback or correction circuit in effect, will be turned off and the voltage across the capacitor 31 will decay, decreasing the biasing current $I_1$ to a point which allows the sum of the currents $I_2$ and $I_3$ to return the operating point to the fixed reference point $b$.

If the drift of the operating point, between the occurrence of the positive D pulses, below the reference point $b$ is not sufficient to cause the negative spike resulting from the differentiating to occur between times $t_0$ and $t_1$ there is no output from the AND gate 24. Conversely, if the operating point does not drift sufficiently above the reference point $b$ such that the negative spike resulting from the differentiating does not occur between time $t_3$ and $t_4$, there is no output from the AND gate 26 to which the negative pulse C is applied.

The pulse repetition rate of the pulses shown in FIGURE 3 is such that the operating point will drift only very slightly above or below the reference point $b$. If desired, the source of negative potential $-V$ applied to terminal 33 can be a constant potential source in order to minimize any drift that may tend to occur.

If the sense coil 36 is held stationary, changes of intensity in a magnetic field in which it is placed will induce currents in the coil 36 which are applied to the third winding 17 which in turn will shift the operating point of the core 16 along the hysteresis loop above or below the fixed reference point $b$. The direction of this shift depends upon the direction of the signal current through the windings 17. The amount of this shift will be proportional or commensurate with the changes in intensity. Conversely, if the sense coil 36 is rotated in a static magnetic field, an A.C. current will be induced in the sense coil which also flows through the third winding 17 alternately moving the operating point above and below the predetermined reference point $b$. Assume that a signal current through the third winding 17 causes the operating point to be shifted below the fixed reference point $b$ to point $c$. The switching time of the core 16 which determines the width of the pulse induced into the windings 11 by the positive D switching pulse will be less than ½T. The negative spike resulting from differentiating the induced pulse now occurs between times $t_0$ and $t_1$ and will be passed by the AND gate 25 because it coincides with the occurrence of the negative pulse B also applied, by way of terminal 22, to the AND gate 25. This negative spike will be fed back, by way of the lead 29 and the amplifier 30, to the capacitor 31 as explained herein above. The negative spike resulting from this differentiation will also pass through the AND gate 24 because it coincides with the occurrence of the negative pulse A which is applied by way of terminal 21 to the AND gate 24 thereby giving an output on terminal 27 of the AND gate which indicates a change of intensity of the magnetic field associated with the sense coil 36 when the sense coil is held stationary. The output of the AND gate 24 can be utilized to give an indication of changes in intensity or the time of its occurrence can be measured (not shown) to give a quantitative measure of the change in intensity creating the signal current appearing in the sense coil 36.

If changes of intensity occur in a reverse magnetic field, the operating point will be shifted above the reference point $b$ towards point $a$. When the positive D pulse occurs the switching time will now be greater than ½T. Accordingly, the negative spike resulting from differentiating the pulse induced in the biasing winding 11 will occur at a time between $t_3$ and $t_4$, thereby giving an output on terminal 28 of the AND gate 26 because the spike will occur during the time of the negative C pulse which is applied to the AND gate 26 by way of terminal 23. No output will be obtained from the AND gates 24 and 25 because the occurrence of the negative spike resulting from the differentiating operation arrives at these AND gates subsequent to the negative pulses A and B which are applied thereto respectively. The negative output of AND gate 26 appearing on terminal 28 may be utilized to give an indication of the signal current in the third winding 17 or the time of its occurrence may be determined to give a quantitative measure of the changes in intensity of the reverse magnetic field which induces the current in the sense coil 36. Determining the time of occurrence of the negative spike is equivalent to measuring the time duration of the voltage pulse induced into the biasing winding 11.

Due to the feedback by way of the lead 29 and the amplifier 30, which holds the static operating point stable at the fixed reference point $b$, the circuit shown in FIGURE 2 is not affected by wide variations in temperature or supply voltage $-V$ which, in the absence of the feedback, would tend to shift the static operating point away from the fixed reference point $b$.

Also, once the values of the resistors 32, 34, and 35 are determined to give the proper currents $I_3$ and $I_2$ for a given potential source $-V$ and feedback voltage, the magnetometer shown in FIGURE 2 can be put in service without the necessity of any periodic adjustments.

The sensitivity of the circuit shown in FIGURE 2 may be easily increased or decreased depending upon the specific utilization of the circuit. For example, by decreasing the time between $t_1$ and $t_3$ (FIGURE 3), which corresponds respectively to the termination of the negative pulse A and the initiation of the negative C pulse, smaller variations above or below the fixed operating point $b$, caused by signal currents in the windings 17, can be detected. Also, the number of turns in windings 17 may be increased thereby shifting the operating point further away from the predetermined reference point $b$ for a given amount of signal current induced in the sense coil 36. Also, the slope of hysteresis loop characteristic curve can be increased to provide a greater change of flux density in the magnetic core 16 for a given amount of magnetizing force produced by the signal in the windings 17.

In the apparatus shown in FIGURE 2 the differentiating circuit, comprising the capacitor 18 and the resistor 19, and the AND gates, 24, 25 and 26, are utilized to detect, and to give a measure of the duration of the positive voltage pulse induced into the biasing winding 11 caused by switching of the core 16 by the positive D pulse. It will be obvious to those skilled in the art that many other circuit techniques may be used for detecting and for giving a measure of the duration of the voltage pulse induced in winding 11.

The turns ratio of the biasing winding 11 and the switching winding 12 can be such that a transformer action occurs whereby the amplitude of the voltage pulse induced in the bias winding 11 is of greater magnitude than the voltage pulse applied to the switching winding 12. This results in larger magnitude negative output spikes from the AND gate 25 which can have sufficient amplitude to render the use of the amplifier 30 unnecessary. It should also be noted that the larger the ratio of the feedback current $I_3$ to the circuit $I_2$ provided by the negative source of potential $-V$, the greater the variations of the operating point, due to drifting, around the fixed reference point $b$ which can be corrected by the feedback circuit.

What has been described is a magnetometer which utilizes the switching time of magnetic material having a substantially rectangular hysteresis characteristic for detecting and measuring a static or dynamic magnetic field.

What we claim is:
1. A magnetometer comprising:
(a) a magnetic core having a hysteresis loop characteristic providing at least two stable states with a fixed switching time therebetween,
(b) means biasing the static operating point of said magnetic core at a predetermined reference flux level on said hysteresis loop intermediate said stable states,
(c) means responsive to disturbances in a magnetic field for shifting said operating point on said hysteresis loop away from said reference flux level an amount commensurable with said disturbances thereby chang- ing the time required to switch said magnetic material into one of its said stable states and, (d) means for switching said core and, (e) means coupled to said magnetic core for determining the time required to switch said magnetic core into one of its said stable states thereby to provide an indication and measure of disturbances in said magnetic field.

2. A circuit for detecting changes in intensity of a magnetic field comprising:

(a) a magnetic core having a substantially rectangular hysteresis loop characteristic with a fixed switching time between the saturated end portion of said loop, (b) means for biasing the operating point of said core at a fixed non-saturated reference flux level on said hysteresis loop, (c) means responsive to changes of intensity in said magnetic field for moving said operating point away from said reference flux level and along said hysteresis loop correspondingly changing the switching time of said core, (d) means for switching said core and, (e) means coupled to said core for determining the switching time of said core providing an indication of changes of intensity of said magnetic field.

3. A circuit for detecting and measuring the intensity and direction of a magnetic field comprising:

(a) a magnetic core having a substantially rectangular hysteresis loop characteristic with a fixed switching time between the saturated end portions of said loop, (b) biasing means for biasing the static operating point of said core at a fixed non-saturated reference flux level, (c) means responsive to changes of intensity and direction in said magnetic field for moving said operating point bidirectionally away from said reference flux level thereby changing the switching time of said core, (d) means for switching said core and, (e) means coupled to said core for determining the switching time of said core to provide an indication of the magnitude and direction of changes in intensity of said magnetic field and, (f) feedback means coupled between said determining means and said biasing means for returning said operating point of said core to said fixed reference flux level following any deviation of the operating point from said reference flux level.

4. A device for detecting disturbances in a magnetic field comprising:

(a) a magnetic core having a substantially rectangular hysteresis loop characteristic providing two stable states with a fixed switching time therebetween, (b) means biasing the operating point of said magnetic core on said hysteresis loop at a predetermined reference flux level between said two stable states, (c) means responsive to disturbances in said magnetic field for moving said operating point on said hysteresis loop interjacent said stable states thereby changing the time required to switch said magnetic core into one of said stable states, (d) constant voltage switching means for switching said magnetic core into one of said stable states, (e) means for determining the switching time of said magnetic core to provide an indication of the magnitude and direction of disturbances in said magnetic field and, (f) feedback means coupled between said determining means and said biasing means for returning said operating point to said reference flux level on said hysteresis loop following any deviation of the operating point from said reference flux level.

5. A circuit for detecting and measuring changes in intensity of a magnetic field comprising:

(a) a magnetic core of substantially rectangular hysteresis loop characteristic with a fixed switching time between the saturated end portions of said loop having at least a first, a second and a third winding thereon, (b) said core having two stable magnetic states resulting from said hysteresis loop characteristic, (c) voltage means coupled to said first winding for biasing the static operating point of said core at a predetermined reference flux level between said two stable states on said hysteresis loop, (d) means responsive to changes in intensity of said magnetic field coupled to said third winding on said core for moving said operating point of said core along said hysteresis loop intermediate said two stable states an amount commensurate with said changes in intensity of said magnetic field, (e) a source of pulses of constant voltage amplitude, and sufficient duration, coupled to said second winding for switching said core into one of its said stable states, the switching of said core inducing a voltage pulse in said first winding, (f) said switching induced voltage pulse having a duration determined by the position of said operating point along said hysteresis loop immediately before said core is switched into one of its stable states and, (g) duration determining means coupled to said first winding for sensing the duration of said switching pulse induced voltage pulse in said first winding to provide with each core switching operation a corresponding time duration to thereby indicate the location of said moving operating point on said hysteresis loop.

6. The combination defined in claim 5 further including feedback means coupled between said duration determining means and said first winding for returning the operating point of said core to said fixed reference flux level in response to duration determining signals indicating a deviation of said operating point from the reference flux level on said core hysteresis loop.

7. A circuit for detecting and measuring changes in intensity of a magnetic field comprising:

(a) a magnetic core of substantially rectangular hysteresis loop characteristic with a fixed switching time between the saturated end portions of said loop having at least a first and a second and a third winding thereon, (b) said core having two stable magnetic states provided by said hysteresis loop characteristic, (c) voltage means coupled to said first winding for biasing the operating point of said core at a predetermined reference flux level between said two stable states on said hysteresis loop, (d) means responsive to changes in intensity of said magnetic field coupled to said third winding on said core for moving said operating point of said core away from said reference point and along said hysteresis loop intermediate said two stable states an amount commensurate with said changes in intensity, (e) a source of pulses of constant voltage amplitude and sufficient duration coupled to said second winding for switching said core into one of its said stable states, the switching of said core inducing a voltage pulse in said first winding, (f) said switching induced voltage pulse having a duration determined by the position of said operating point along said hysteresis loop immediately before said core is switched into one of its stable states, (g) first duration determining means coupled to said first winding to provide an output whenever the duration of said induced voltage pulse is equal to or less than a predetermined time equal in duration to the time required to switch the reference flux level and, (h) a second duration determining means coupled to said first winding to provide a first and a second output signal respectively indicating switching duration times less than, and greater than, the switching time duration corresponding to said predetermined time.

8. The combination defined in claim 7 further comprising feedback means including a capacitor commonly connected to said first duration determining means and said first core winding, said capacitor to be charged through said first winding when the switching duration determination is less than the duration corresponding to the time required to switch the reference flux level.

9. The combination defined in claim 7 further including an RC differentiating circuit coupled between said first winding and said first and second duration determining means.

10. A circuit for detecting and measuring changes in intensity of a magnetic field comprising:
   (a) a magnetic core of substantially rectangular hysteresis loop characteristic with a fixed switching time between the saturated end portions of said loop having at least a first, a second and a third winding thereon,
   (b) said core having two stable magnetic states provided by said hysteresis loop characteristic,
   (c) voltage means coupled to said first winding for biasing the static operating point of said core at a predetermined reference flux level between said two stable states on said hysteresis loop,
   (d) means responsive to changes in intensity of said magnetic field connected to said third winding on said core for moving said operating point of said core along said hysteresis loop intermediate said two stable states an amount commensurate with said changes in intensity,
   (e) a source of pulses having constant voltage amplitude coupled to said second winding for switching said core into one of its said stable states, the switching of said core inducing a voltage pulse in said first winding,
   (f) said switching voltage pulse induced in said first winding having a duration determined by the position of said operating point along said hysteresis loop immediately before said core is switched into one of its stable states,
   (g) first duration determining means coupled to said first winding to provide an output whenever the duration of said switching pulse induced in said first winding does not exceed a predetermined time equal in duration to the time required to switch the reference flux level,
   (h) second duration determining means coupled to said first winding to provide an output indicative of changes in intensity of said magnetic field in a first direction whenever the duration of said switching pulse induced in said first winding exceeds said predetermined time and,
   (i) third duration determining means coupled to said first winding to provide an output indicative of changes in intensity of a magnetic field in a second direction whenever the duration of said switching pulse induced in said first winding is less than said predetermined time.

11. The combination defined in claim 10 further including an RC network coupled between said first winding and said first, second and third duration determining means for differentiating the voltage pulse induced in said first winding.

12. The combination defined in claim 10 further comprising a feedback circuit connected between said first duration determining means and said first winding including a capacitor which is charged by the output of said first duration determining means through said first winding to maintain the operating point of said core stable at said fixed reference flux level in the absence of changes in intensity of said magnetic field.

13. A magnetometer comprising:
   (a) a magnetic core having a substantially rectangular hysteresis loop characteristic providing two stable states with a fixed switching time therebetween,
   (b) first means coupled to said core for biasing the operating point of said magnetic material at a predetermined reference flux level on said hysteresis loop intermediate said stable states,
   (c) second means coupled to said core having means movable in a magnetic field for shifting said operating point on said hysteresis loop away from said reference flux level an amount commensurable with the magnitude of said magnetic field thereby changing the time required to switch said core into one of its said stable states,
   (d) means for switching said core and,
   (e) means coupled to said core for determining the time required to switch said core into one of its said stable states to provide an indication of the direction and measure of the magnitude of said magnetic field, 14. A circuit for detecting and measuring a magnetic field comprising:
   (a) a magnetic core having a substantially rectangular hysteresis loop characteristic with a fixed switching time between the saturated end portions of said loop,
   (b) means for biasing the static operating point of said core at a fixed non-saturated reference flux level,
   (c) a generating probe movable in said magnetic field to provide a signal voltage proportional to the magnitude and direction of said magnetic field,
   (d) said signal voltage coupled to said magnetic core from said probe to cause said operating point to move about said fixed reference flux level along the said hysteresis loop thereby changing the switching time of said core,
   (e) means for switching said core,
   (f) means inductively coupled to said core for determining the switching time of said core to provide a measure of said magnetic field and,
   (g) feedback means coupled between said switching time determining means and said biasing means causing said biasing means to be controlled by the switching time of said core to thereby maintain said operating point stable at said fixed reference flux level.

References Cited by the Examiner

UNITED STATES PATENTS

| | | | |
|---|---|---|---|
| 2,991,414 | 7/1961 | Tillman | 324—43 |
| 3,027,547 | 3/1962 | Froehlich | 307—88 |
| 3,068,462 | 12/1962 | Medoff | 340—174 |

WALTER L. CARLSON, *Primary Examiner.*

RICHARD B. WILKINSON, *Examiner.*

F. A. SEEMAR, R. J. CORCORAN,
*Assistant Examiners.*